United States Patent Office 3,299,023
Patented Jan. 17, 1967

3,299,023
METHODS OF POLYMERIZING N-VINYL IMIDES
Frederick Grosser, Midland Park, and Marvin R. Leibowitz, Edison, N.J., assignors to General Aniline & Film Corporation, New York, N.Y., a corporation of Delaware
No Drawing. Filed June 26, 1963, Ser. No. 290,651
11 Claims. (Cl. 260—88.3)

The present invention relates, in general, to nitrogen-vinyl polymers and, in particular, to insoluble polymers of cyclic N-vinyl imides and methods of making the same which find immediate and general applicability for use as beverage clarifiers, components of filter bed packings, complexing agents, dye receptors and plastic films.

Nitrogen-vinyl polymers and particularly N-vinyl imides of the cyclic types have heretofore been polymerized by a variety of methods. Usually successful polymerization of N-vinyl imides depends to a great extent upon the purity of the starting material. In any event, however, it is known that pure N-vinyl imides polymerize readily under the influence of light, heat or peroxide catalysts, providing, in most cases, high softening polymers which are tough, readily swollen by, and in some instances soluble in, water and rather unstable. For example, Hanford and Stevenson, in U.S. 2,276,840 polymerized N-vinyl succinimide in aqueous suspension with benzoyl peroxide as a catalyst for a period of ten minutes at a temperature of 85° C. to produce a dry granular powder. The poly N-vinyl succinimide was swollen readily by water, acetone or alcohols and was soluble in phenols, dimethyl formamide, dilute mineral acids and organic aliphatic acids. Thus, while the polymers were generally characterized by high softening points making them admirably suited for certain end uses, their water susceptibility and solubility in common organic solvents limited their usefulness to those areas where water susceptibility and solubility in common organic solvents were not of primary concern. Thus, it is apparent that a need exists for polymers of N-vinyl imides and methods of producing the same, which are insoluble in common organic solvents and which are not swollen by or soluble in water.

Accordingly, it is an object of this invention to provide insoluble polymers of N-vinyl imides.

Another object of this invention resides in the provision of novel methods for producing insoluble polymers of N-vinyl imides.

Yet another object of this invention resides in the provision of insoluble polymers of N-vinyl imides which are not swollen by water and which are not soluble in common organic solvents.

Further objects and advantages of the invention will become further apparent from the following detailed description thereof.

The present invention is based on the discovery that insoluble polymers of N-vinyl imides are readily and efficaciously produced by methods which comprise heating an N-vinyl imide at an elevated temperature in the presence of a catalytic amount of a catalyst selected from the group consisting of hydrides and borohydrides of alkali metals for a period of time sufficient to produce an insoluble polyvinyl imide.

The N-vinyl imides which are amenable to the polymerization methods of this invention can be conveniently represented by the following general formula:

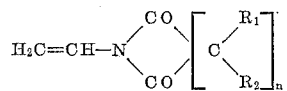

wherein $R_1$ and $R_2$ represent hydrogen and alkyl groups and $n$ represents a whole positive integer of 1 through 4 wherein all carbon valences are tetravalent.

Representative N-vinyl imides within the scope of the general formula above which can be employed as starting materials to produce insoluble polymers are set forth in the following Table I:

TABLE I

| n | $R_1$ | $R_2$ |
|---|---|---|
| 1 | H | H |
| 1 | $CH_3$ | H |
| 1 | $CH_3$ | $CH_3$ |
| 2 | H | H |
| 2 | $CH_3$ | $CH_3$ |
| 2 | $C_2H_5$ | $CH_3$ |
| 2 | $C_2H_5$ | H |
| 2 | $C_5H_9$ | H |
| 3 | H | H |
| 3 | H | $CH_3$ |
| 3 | $CH_3$ | $CH_3$ |
| 3 | $C_2H_5$ | H |
| 3 | $C_2H_5$ | $CH_3$ |
| 3 | $C_3H_7$ | $C_2H_5$ |
| 4 | H | H |
| 4 | $CH_3$ | $CH_3$ |
| 4 | H | $CH_3$ |
| 4 | H | $C_2H_5$ |
| 4 | H | $C_3H_7$ |
| 4 | $C_3H_7$ | $CH_3$ |

Typical N-vinyl imides which can be employed as starting materials in the methods of the invention include: N-vinyl malonimide; N-vinyl succinimide; N-vinyl glutarimide; N-vinyl maleidide; N-vinyl-$\beta$-methylglutarimide; N-vinyl-$\alpha$-amylsuccinimide; and N-vinyl adipimide.

The classes of catalyst which have been found effective in promoting the polymerization of N-vinyl imides include the hydrides and borohydrides of the alkali metals. Representative alkali metal hydrides and borohydrides which have been tested and found effective include sodium borohydride, potassium borohydride and sodium hydride. Other alkali metal hydrides and borohydrides which can also be employed include lithium hydride, lithium borohydride, cesium hydride, cesium borohydride, rubidium hydride and rubidium borohydride. If desired, mixtures of alkali metal hydrides and/or alkali metal borohydrides can be employed as catalysts for the polymerization.

In one aspect of this invention the provision for the use of alkali metal hydrides and/or borohydrides in combination with alkali and alkaline earth metals and their corresponding oxides, hydroxides and alkoxides is included since it has been found that such mixtures are entirely suitable for polymerizing N-vinyl imides to insoluble polymers.

The amount of catalyst necessary to effect polymerization of the N-vinyl imide is not necessarily a critical feature of the invention and can be varied over a wide range of from about .05 weight percent to 5.0 weight percent, based on monomer, although amounts above and below this range can be employed if desired. An amount of catalyst of about 1.0 weight percent provides an optimum of reaction rates and reaction times and is therefore preferred.

The polymerization can be effected by heating the N-vinyl imide over a wide range of temperatures of from about 40° C. to about 200° C. under subatmospheric, atmospheric or superatmospheric conditions, as desired.

If desired, the polymerization of the N-vinyl imide can be effected in the presence of inert organic solvents for the monomer or the monomer can be dispersed in an inert reaction diluent.

The reaction periods usually will vary considerably depending upon a variety of factors, such as catalyst, catalyst concentration, the temperature employed, and the like. Usually polymerization varies over a period of from two to about twenty-four hours. When polymerization does start, it is normally completed within about ten minutes.

In carrying out the methods of the invention, an N-vinyl imide is charged to a reaction vessel equipped with a stirrer, reflux condenser and thermometer. The selected catalyst is charged at the same time or shortly thereafter. The contents of the reaction vessel are preferably purged with nitrogen gas or any other inert gas and the pressure on the reaction medium reduced and heat applied. Normally the contents of the reaction vessel are preferably agitated with the stirrer and the material maintained at reflux. After polymerization has been initiated the liquid N-vinyl imide will turn to a powder within about ten minutes. The product is then recovered by any conventional means, such as by filtration, whereupon it is washed and dried.

The following examples will serve to further illustrate the practice of the invention with greater particularity although it is to be understood that the invention is not limited thereto.

*Example 1*

To a 500 milliliter four-necked flask equipped with an agitator, reflux condenser and thermometer were charged 50 grams of N-vinyl succinimide and 0.25 gram of sodium borohydride flakes. The flask was purged with nitrogen gas, the pressure reduced to 50 milliliters of Hg absolute and the material heated to a reflux temperature of approximately 160° C. After approximately five hours at reflux, polymerization was initiated and the liquid N-vinyl succinimide turned to a powder within ten minutes. The pressure was brought to atmospheric pressure and the material removed from the flask and drowned in water, heated, filtered, washed, dried and ground.

While the invention has been described in its various embodiments and specifically illustrated in the example with respect to certain methods for polymerizing N-vinyl imides and novel catalyst combinations useful therefor in achieving one or more objects of the invention, it is apparent that the invention is not subject to restriction thereto since obvious modifications thereof will occur to persons skilled in the art. Therefore, it is intended that the invention shall include all such modifications and be interpreted as being applicable thereto insofar as the state of the art permits.

What is claimed is:

1. The method of producing an insoluble polymer of an N-vinyl imide which comprises heating an N-vinyl imide corresponding to the formula:

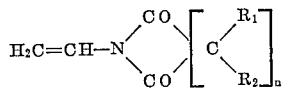

wherein $R_1$ and $R_2$ represent a member of the group consisting of hydrogen and alkyl groups and $n$ represents a whole positive integer of 1 through 4, and wherein all carbon valences are tetravalent at an elevated temperature in the presence of a catalytic amount of a catalyst selected from the group consisting of hydrides and borohydrides of alkali metals.

2. The method according to claim 1 wherein the temperature varies from about 40° C. to about 200° C. and the catalyst is present in an amount of from about 0.05 to 5.0 weight percent based on the imide.

3. The method according to claim 1 wherein the catalyst is sodium borohydride.

4. The method according to claim 1 wherein the catalyst is potassium borohydride.

5. The method according to claim 1 wherein the catalyst is sodium hydride.

6. The method of producing an insoluble polymer of an N-vinyl imide which comprises heating an N-vinyl imide corresponding to the formula:

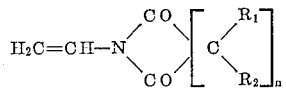

wherein $R_1$ and $R_2$ represent a member of the group consisting of hydrogen and alkyl groups and $n$ represents a whole positive integer of 1 through 4, and wherein all carbon valences are tetravalent at an elevated temperature of about 40° C. to about 200° C. in the presence of a catalytic amount of a catalyst selected from the group consisting of hydrides and borohydrides of alkali metals for a period of time sufficient to produce an insoluble polyvinyl imide.

7. The method according to claim 6 wherein the imide is N-vinyl succinimide.

8. The method according to claim 6 wherein the imide is N-vinyl glutarimide.

9. The method according to claim 6 wherein the imide is N-vinyl$\beta$-methylglutarimide.

10. The method according to claim 6 wherein the imide is N-vinyl$\alpha$-amylsuccinimide.

11. The method according to claim 6 wherein the imide is N-vinyl adipimide.

References Cited by the Examiner

UNITED STATES PATENTS 2,231,887  2/1941  Conaway _____ 260—88.3

OTHER REFERENCES

Schildknecht, Vinyl and Related Polymers, John Wiley and Sons, Inc., New York (1952), p. 122.

JOSEPH L. SCHOFER, *Primary Examiner.*

JAMES A. SEIDLECK, H. WONG, *Assistant Examiners.*